(12) United States Patent
Ogawa et al.

(10) Patent No.: US 11,853,066 B2
(45) Date of Patent: Dec. 26, 2023

(54) CONTROL DEVICE, FORMATION DETERMINATION DEVICE, CONTROL METHOD, AND PROGRAM

(71) Applicant: NEC Corporation, Tokyo (JP)

(72) Inventors: Masatsugu Ogawa, Tokyo (JP); Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 17/417,220

(22) PCT Filed: Dec. 27, 2018

(86) PCT No.: PCT/JP2018/048355
§ 371 (c)(1),
(2) Date: Jun. 22, 2021

(87) PCT Pub. No.: WO2020/136850
PCT Pub. Date: Jul. 2, 2020

(65) Prior Publication Data
US 2022/0075379 A1 Mar. 10, 2022

(51) Int. Cl.
*G05D 1/00* (2006.01)
*G05D 1/02* (2020.01)

(52) U.S. Cl.
CPC ......... *G05D 1/0212* (2013.01); *G05D 1/0016* (2013.01)

(58) Field of Classification Search
CPC .. G05D 1/0212; G05D 1/0016; G05D 1/0094; G05D 1/0027; G08B 21/0263;
(Continued)

(56) References Cited

U.S. PATENT DOCUMENTS 10,310,518 B2 * 6/2019 MacCready ........... G05D 1/104
2006/0015215 A1   1/2006 Howard et al.
(Continued)

FOREIGN PATENT DOCUMENTS

CN   108801266 A * 11/2018 ............. G01C 21/20
JP   H07-234721 A   9/1995
(Continued)

OTHER PUBLICATIONS

Machine Translation CN 108801266 (year: 2018).*
(Continued)

*Primary Examiner* — Anne Marie Antonucci
*Assistant Examiner* — Lidia Kwiatkowska

(57) ABSTRACT

A control device acquires position information of an unmanned machine subject to control, and position information of an unmanned machine not subject to control; attempts to detect a target object, using a sensor signal from a sensor mounted in at least one of the unmanned machines; calculates a presence probability distribution of the target object based on information on a position and a time at which detection of the target object is successful; determines a formation of the unmanned machines based on the presence probability distribution of the target object; calculates an operation amount of the unmanned machine subject to control, based on the formation; and performs operation setting on the unmanned machine subject to control, according to the calculated operation amount.

9 Claims, 9 Drawing Sheets

(58) Field of Classification Search
CPC ... B60W 2050/0063; B60W 2050/0064; F01L 2009/2169
See application file for complete search history.

(56) References Cited

U.S. PATENT DOCUMENTS

| | | | |
|---|---|---|---|
| 2015/0112461 A1* | 4/2015 | Buckley | E02B 15/08 700/90 |
| 2017/0072565 A1* | 3/2017 | Egerstedt | B25J 9/1682 |
| 2017/0146991 A1* | 5/2017 | Parekh | G08G 5/0082 |
| 2019/0354113 A1 | 11/2019 | Ogawa et al. | |

FOREIGN PATENT DOCUMENTS

| | | |
|---|---|---|
| JP | 2004017743 A | 1/2004 |
| JP | 4617293 B2 | 1/2011 |
| JP | 4926958 B2 | 5/2012 |
| JP | 5271772 B2 | 8/2013 |
| JP | 5559671 B2 | 7/2014 |
| JP | 2016-052835 A | 4/2016 |
| JP | 2017-519279 A | 7/2017 |
| WO | 2018105599 A1 | 6/2018 |

OTHER PUBLICATIONS

Japanese Office Action for JP Application No. 2020-562252, dated Feb. 7, 2023 with English Translation.
Japanese Office Action for JP Application No. 2020-562252 dated Sep. 13, 2022 with English Translation.
International Search Report for PCT Application No. PCT/JP2018/048355, dated Mar. 12, 2019.
Kawakami, Kohei et al., "Self-Organization of Action Control Architecture for Multi-Agent System", Lecture preprints of the 25th Annual Conference of the Robotics Society of Japan, Sep. 2007, pp. 1-4, 1D13.
JP Office Action for JP Application No. 2020-562252, dated Aug. 1, 2023 with English Translation.

* cited by examiner

CONTROL DEVICE, FORMATION DETERMINATION DEVICE, CONTROL METHOD, AND PROGRAM

This application is a National Stage Entry of PCT/JP2018/048355 filed on Dec. 27, 2018, the contents of all of which are incorporated herein by reference, in their entirety.

TECHNICAL FIELD

The present invention relates to a control device, a formation determination device, a control method, and a program.

BACKGROUND ART

Applications using unmanned machines have been proposed. A disk-shaped robot that automatically cleans a room and an unmanned machine (a drone) that flies in the air to perform delivery are examples of such applications. Another example is a robot that operates in a dangerous environment such as a nuclear power plant.

Also, application examples using a plurality of unmanned machines have been proposed. Examples of such applications include one in an e-commerce (electric commerce) factory that uses a plurality of robots for transporting goods to rapidly collect commodities ordered by customers (see Patent Document 1). Another example is an application in which a plurality of unmanned machines are used to search for a search target (see Patent Document 2).

The application of searching for a search target using a plurality of unmanned machines is, for example, being studied as a defense-related technology. The unmanned machine in this case is generally referred to as a UxV (Unmanned x Vehicle), where an unmanned aerial vehicle is referred to as a UAV (Unmanned Air Vehicle), an unmanned ship is referred to as a USV (Unmanned Surface Vehicle), and an unmanned underwater ship is referred to as a UUV (Unmanned Undersea Vehicle).

The unmanned machines mentioned above are classified into two types, those operated remotely by a human and those capable of acting autonomously by means of an installed program. Of these, an unmanned machine or a group of unmanned machines capable of acting autonomously by means of an installed program are desired to perform various types of actions and labor on behalf of humans even in the absence of humans. Unmanned machines are expected to operate intelligently with excellent artificial intelligence incorporated thereinto, which is part of the reason behind artificial intelligence research being actively conducted.

An unmanned machine operating intelligently means, in other words, that the unmanned machine changes its actions autonomously when the situation demands it. In general, an unmanned machine is often to perform multiple missions (actions), and is required to change its actions when the situation demands it. An unmanned machine is required to change its missions in some cases where, for example, the unmanned machine is to search for a dangerous object first, and then track the discovered dangerous object if it moves and capture it if the situation demands it. In this example, searching, tracking and capturing are taken as examples of missions.

At present, a human often switches missions remotely, and, it is desired in the future that unmanned machines make decisions autonomously and switch missions automatically.

As a method for switching actions, a method has been proposed in relation to electric trains in which state transitions are preliminarily set and actions are automatically switched based on IF-THEN conditional determination (see Patent Document 3 and Patent Document 4).

PRIOR ART DOCUMENTS

Patent Documents

[Patent Document 1] Japanese Patent No. 4617293
[Patent Document 2] Japanese Patent No. 4926958
[Patent Document 3] Japanese Patent No. 5271772
[Patent Document 4] Japanese Patent No. 5559671

SUMMARY OF THE INVENTION

Problem to be Solved by the Invention

As described above, use of a single unmanned machine or a group of unmanned machines has been proposed, and practical applications in various fields have started to be studied. One of the fields where utilization of an unmanned machine or a group of unmanned machines is considered to be promising is the field of security. An operation of capturing a target such as a suspicious person, a criminal, a dangerous person, and an extermination target animal is an example of utilizing an unmanned machine or a group of unmanned machines in the field of security.

For example, when an incident occurs, the target that is on the run in an area around the point where the incident occurred must not be missed and must be captured. In such a case, a labor-intensive approach may be considered for finding and capturing the target; however, this type of approach consumes an enormous amount of manpower and time, which is a large cost. In addition, due to the recent labor shortage, it may not be possible to reserve sufficient manpower.

When making an attempt of finding and capturing a target in a labor-intensive approach while sufficient manpower cannot be reserved, there is a possibility of repeatedly allowing the target to escape. Thus, utilization of multiple unmanned machines is expected to perform effective capturing while reducing the manpower.

An example object of the present invention is to provide a control device, a formation determination device, a control method, and a program capable of capturing a target object effectively.

Means for Solving the Problem

According to a first example aspect of the present invention, a control device includes: an information acquisition and transmission unit that acquires position information of an unmanned machine subject to control, and position information of an unmanned machine not subject to control; a target object detection unit that attempts to detect a target object, using a sensor signal from a sensor mounted in the unmanned machine; a presence probability calculation unit that calculates a presence probability distribution of the target object based on information on a position and a time at which detection of the target object is successful; a formation determination unit that determines a formation of a plurality of the unmanned machines based on the presence probability distribution of the target object; an operation amount calculation unit that calculates an operation amount of an unmanned machine subject to control, based on the formation; and an operation setting unit that performs operation setting on an unmanned machine subject to control, according to the calculated operation amount.

According to a second example aspect of the present invention, a formation determination device includes: an information acquisition and transmission unit that acquires position information of a plurality of unmanned machines; a target object detection unit that attempts to detect a target object, using a sensor signal from a sensor mounted in the unmanned machine; a presence probability calculation unit that calculates a presence probability distribution of the target object based on information on a position and a time at which detection of the target object is successful; and a formation determination unit that determines a formation of a plurality of the unmanned machines based on the presence probability distribution of the target object.

According to a third example aspect of the present invention, a control method includes: a step of acquiring position information of an unmanned machine subject to control, and position information of an unmanned machine not subject to control; a step of attempting detection of a target object, using a sensor signal from a sensor mounted in the unmanned machine; a step of calculating a presence probability distribution of the target object based on information on a position and a time at which detection of the target object is successful; a step of setting a parameter value for determining a formation of a plurality of the unmanned machines based on the presence probability distribution of the target object; a step of calculating an operation amount of an unmanned machine subject to control, based on the formation; and a step of performing operation setting on an unmanned machine subject to control, according to the calculated operation amount.

According to a fourth example aspect of the present invention, a program is a program for causing a computer to execute: a step of acquiring position information of an unmanned machine subject to control, and position information of an unmanned machine not subject to control; a step of attempting detection of a target object, using a sensor signal from a sensor mounted in the unmanned machine; a step of calculating a presence probability distribution of the target object based on information on a position and a time at which detection of the target object is successful; a step of setting a parameter value for determining a formation of a plurality of the unmanned machines based on the presence probability distribution of the target object; a step of calculating an operation amount of an unmanned machine subject to control, based on the formation; and a step of performing operation setting on an unmanned machine subject to control, according to the calculated operation amount.

Effect of the Invention

According to the control device, the formation determination device, the control method, and the program mentioned above, capturing of a target object can be performed more efficiently.

EXAMPLE EMBODIMENT

Hereinafter, example embodiments of the present invention is described, however, the present invention within the scope of the claims is not limited by the following example embodiments. Furthermore, all the combinations of features described in the example embodiment may not be essential for the solving means of the invention.

Figure 1:
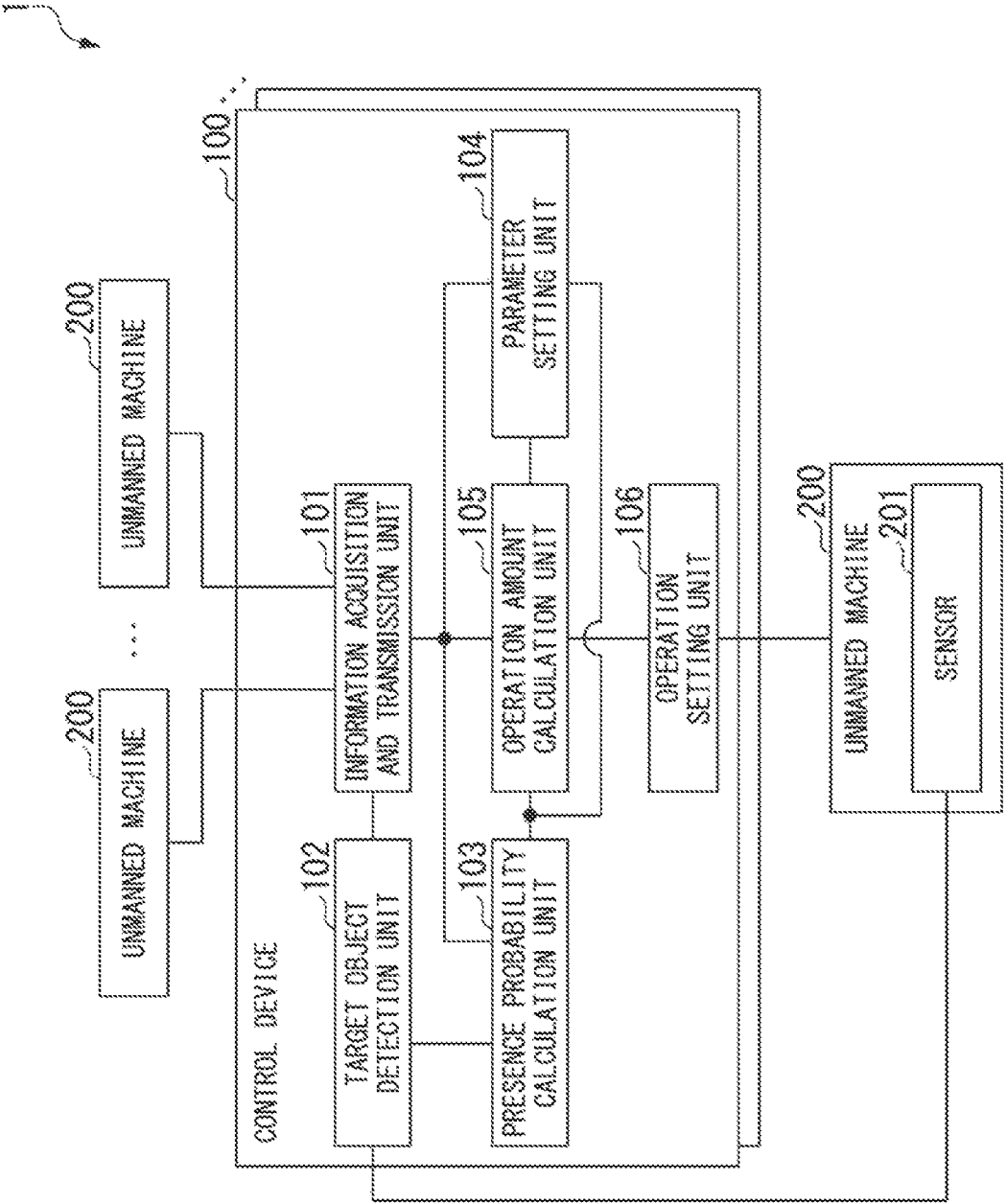
FIG. 1 is a schematic diagram showing a first example of a configuration of an unmanned machine system according to an example embodiment.

FIG. 1 is a schematic diagram showing a first example of a configuration of an unmanned machine system according to an example embodiment. In the configuration shown in FIG. 1, an unmanned machine system 1 includes a plurality of control devices 100 and a plurality of unmanned machines 200. The control device 100 includes an information acquisition and transmission unit 101, a target object detection unit 102, a presence probability calculation unit 103, a parameter setting unit 104, an operation amount calculation unit 105, and an operation setting unit 106. The unmanned machines 200 includes a sensor 201.

The unmanned machine system 1 is a system for detecting and capturing a target object, using a plurality of the unmanned machines 200.

The control device 100 is provided one-to-one with the unmanned machine 200, and controls that one unmanned machine 200. The control device 100 may be mounted in an unmanned machine 200 subject to control. Alternatively, the control device 100 may be installed outside the unmanned machine 200 subject to control and may communicate with the unmanned machine 200 subject to control.

The control device 100 may be configured, using a computer such as a workstation, a personal computer (PC), or a microcomputer. Alternatively, the control device 100 may be configured, using hardware designed exclusively for the control device 100, such as an ASIC (Application Specific Integrated Circuit).

Unmanned machines 200 other than the unmanned machine 200 subject to control of the control device 100 are referred to as other unmanned machines 200. One of the plurality of unmanned machines 200 is the unmanned machine 200 subject to control, and unmanned machines 200 other than this are other unmanned machines 200.

The information acquisition and transmission unit 101 acquires, from the unmanned machine 200 subject to control, the position information and the state information of that unmanned machine 200. In addition, the information acquisition and transmission unit 101 acquires, from other communicable unmanned machines 200, the position information and the state information of those unmanned machines 200.

The state information is information indicating the state related to the unmanned machine 200. The state information acquired by the information acquisition and transmission unit 101 includes an evaluation value of the unmanned machine 200 related to the overall action of the plurality of unmanned machines 200, and an evaluation function for calculating the evaluation value. Moreover, the state information acquired by the information acquisition and transmission unit 101 includes information that is associated with an evaluation value or evaluation function, such as setting parameters to be applied to the evaluation function and mathematically processed values of the evaluation function.

Examples of mathematically processed values of the evaluation function acquired by the information acquisition and transmission unit 101 include, but are not limited to, the differentiation and integration of the evaluation function, or both.

The state information may include position information. Alternatively, as described above, the state information and the position information may be treated as separate information.

Moreover, the information acquisition and transmission unit 101 also acquires, from the unmanned machine 200 having detected a target object, information on the position at which the target object was detected and that time.

Furthermore, the information acquisition and transmission unit 101 not only acquires information from other unmanned machines 200 but also reports, to the other unmanned machines 200, the state information of the unmanned machine 200 subject to control and the detection information of the target object by the unmanned machine 200 subject to control.

The target object detection unit attempts to detect a target object, using a sensor signal from a sensor 201 in the unmanned machine 200 subject to control. The sensor signal referred to here is a signal indicating a sensing result. Any one of a camera, an infrared ray sensor, and an ultrasonic wave sensor, or a combination thereof can be used as the sensor 201, however, it is not limited these examples.

The target object detection unit 102 applies a recognition algorithm to a sensor signal from the sensor 201, and makes reference to the recognition result to determine whether or not a target object has been detected. A commonly known algorithm can be used as the recognition algorithm in this case.

If a target object has been detected, the target object detection unit 102 records the position and the time. The recorded position information and time information are used to determine the action of the unmanned machine 200 subject to control, via the presence probability calculation unit 103. Moreover, the target object detection unit 102 outputs the position information and the time information of the detection of the target object to the information acquisition and transmission unit 101. The information acquisition and transmission unit 101 reports the acquired position information and time information to other communicable unmanned machines 200.

The presence probability calculation unit 103 uses the signal from the target object detection unit 102 and the information of the target object retained in other communicable unmanned machines 200 and obtained from the information acquisition and transmission unit 101, to calculate a presence probability distribution of the target object.

The presence probability calculation unit 103 calculates the presence probability distribution of the target object, using the target object information of the unmanned machine 200 subject to control and the target object information of other unmanned machines 200. The target object information of the unmanned machine 200 subject to control is information indicating the detection result such as the position and time in the case where the target object detection unit 102 detects the target object, using the sensor information of the sensor 201 of the unmanned machine 200 subject to control. The target object information of another unmanned machine 200 is information indicating the detection result such as the position and time in the case where the target object detection unit 102 of the control device 100 controlling the unmanned machine detects the target object, using the sensor information of the sensor 201 of the unmanned machine 200.

The presence probability calculation unit 103 calculates a presence probability of a target object, using, for example, the following method.

For all of the target object information of the unmanned machine 200 subject to control and the target object information of other unmanned machines 200, it sets a two-dimensional or three-dimensional Gaussian distribution centered on the position at which the target object has been detected.

At this time, the presence probability calculation unit 103 changes the peak height and spread of the distribution, depending on the detection time of the target object. The presence probability calculation unit 103 sets the peak value of information with the latest time highest among the information of having detected the target object, and lowers the peak value as it gets further from that time. Moreover, the presence probability calculation unit 103 sets the distribution spread of information with the latest time smallest, and increases the distribution spread as it gets further from that time.

Therefore, the presence probability calculation unit 103 calculates a presence probability distribution, the spatial extent of which becomes greater as the length of time that elapses after the target object detection unit 102 succeeds in detecting the target object becomes greater. Here, the spatial extent being great means the variance in the presence probability distribution being great.

When the presence probability calculation unit 103 is to set the presence probability distribution of a target object using a Gaussian distribution as described above, it may set a Gaussian distribution, the variance of which becomes greater as the length of time after the detection of the target object becomes greater.

Moreover, when the presence probability calculation unit 103 is to set a region having a finite area as a region where the presence probability of the target object is greater than 0, it may over time increase the area of the region where the presence probability of the target object is greater than 0.

When there are a plurality of pieces of target object information, the presence probability calculation unit 103 forms a distribution map in which the plurality of pieces of target object information are mapped in a two-dimensional or three-dimensional manner. Any position on the map will have some distribution value. In order to be able to treat this information as a presence probability of the target object, the presence probability calculation unit 103 divides the distribution value of the map by the value obtained by integrating all of the two-dimensionally or three-dimensionally mapped distribution values. As a result, the total of the distribution values of the entire map becomes 1.

For example, when a target object is detected only once and is not detected thereafter, a Gaussian distribution (circular or spherical) is formed with a peak at the location where the target object was detected, and the map is updated so that the peak height becomes lower and the distribution spread becomes greater over time.

When calculating this presence probability distribution, the presence probability calculation unit 103 may superimpose geographical information thereon. For example, when there is a region where the target object cannot enter, a cliff, a valley, or the like, the presence probability calculation unit 103 may always yield 0 as a result of calculating the presence probability at such a location. In this way, it is possible to eliminate unnecessary searches that the unmanned machines 200 would perform at a location into which the target object cannot escape.

The parameter setting unit 104 sets parameters for a formation formed by the plurality of unmanned machines 200, on the basis of the information from the information acquisition and transmission unit 101 and the calculation result of the presence probability calculation unit 103. Specifically, the parameter setting unit 104 sets parameters related to the shape of a formation and the speed of formation change. The parameter setting unit 104 corresponds to an example of the formation determination unit, and determines the formation of the plurality of unmanned machines 200 by setting values in the parameters.

For example, parameter values indicating the shape of formation such as a circular shape, circular arc shape, ellipse shape, double circular shape, or arbitrary shape are predetermined, and the parameter setting unit 104 stores these parameter values. Moreover, the parameter setting unit 104 has a function of selecting a parameter value on the basis of information related to the presence probability distribution of target object.

Any one or more of the magnitude of the peak value of the presence probability distribution of a target object, the variance value, the shape of the presence probability distribution, the size of the presence probability distribution, and the length of time elapsed after the object has been detected may be used as information related to the presence probability distribution of the target object, however, it is not limited to these examples.

Also, the shape of the contour line of the presence probability distribution of the target object may be used as the shape of the presence probability distribution of the target object, however, it is not limited to this example. The contour line of the presence probability of a target object is a line obtained by tracing positions at which the presence probability distribution takes a certain value. The magnitude of the contour line (for example, the area of a portion surrounded by the contour line) may be used as the size of the presence probability distribution of a target object, however, it is not limited to this example.

For example, the parameter setting unit 104 selects one of a plurality of shapes predetermined as formation shapes of the unmanned machines 200. One or more parameters are provided for each formation shape, and the parameter setting unit 104 sets the values of parameters provided for the selected shape.

A plurality of parameter value sets combining each parameter value for each formation shape may be provided, and the parameter setting unit 104 may set a value for each parameter by selecting one of the parameter value sets. The parameter setting unit 104 may select one of the parameter value sets on the basis of information related to the presence probability distribution of the target object.

Alternatively, the parameter setting unit 104 may directly set a value for at least some of the parameters. The parameter setting unit 104 may calculate and set a value to be set for a parameter with no value having been set therefor, on the basis of the presence probability distribution of the target object.

Also, the speed of changing a formation may be set as a velocity vector by the parameter setting unit 104.

The parameter setting unit 104 of all of the control devices 100 can share the same formation by making the same setting or a common setting. Therefore, when one of the control devices 100 determines the formation of the unmanned machines 200, the determined formation may be reported to the other control device 100.

Moreover, for example, in the case of a double-circular shape formation, the parameter setting unit 104 may set a parameter value indicating as to which one of the first circle and the second circle is to have the unmanned machine 200 subject to control arranged therein. Also, in the case of an ellipse shape formation, the parameter setting unit 104 may set a parameter value indicating as to which position in the formation shape is to have the unmanned machine 200 subject to control arranged thereat. The settings of these parameter values correspond to an example of settings that are not the same but are common.

When a parameter value indicating an arbitrary shape among the parameter values indicating the shapes of the formation is set, the parameter setting unit 104 sets a formation shape that takes the presence probability distribution of the target object into consideration.

For example, when a parameter indicating an arbitrary shape among the parameter values indicating the shapes of the formation is set, the parameter setting unit 104 sets a formation of a shape similar to that of the contour line of the presence probability distribution of the target object.

Specifically, the parameter setting unit 104 selects a certain value in the presence probability distribution of the target object to thereby specify the contour line of that value. The parameter setting unit 104 may use the specified contour line unchanged as the formation of the unmanned machines 200. Alternatively, the parameter setting unit 104 may upscale or downscale the specified contour line with the peak position of the presence probability distribution taken as a reference, and use it as the formation of the unmanned machines 200.

Here is described an example in which the parameter setting unit 104 determines the formation of the unmanned machines 200 on the basis of information related to the presence probability distribution of a target object. Here, it is assumed that two shapes, a circular shape and an arbitrary shape, are provided as formation shapes of the unmanned machines 200.

The parameter setting unit 104 sets the presence probability distribution (the value of the presence probability distribution) of the target object to 70 percent of the peak value thereof, and thereby specifies the contour line of the presence probability distribution. Then, the parameter setting unit 104 calculates the smallest circle among circles that include the specified contour line. The parameter setting unit 104 determines whether the ratio of the area of the portion surrounded by the contour line among the area of the calculated circle is equal to or greater than a predetermined threshold value (for example, 80 percent or more).

If the ratio of the area is determined as being equal to or greater than the threshold value, the parameter setting unit 104 determines the calculated circle as the formation, and sets the center coordinates and the radius of the circle as parameter values of the circular shape formation. Moreover, as a change in the formation, the parameter setting unit 104 determines that the unmanned machines 200 are to move toward the center of the circle at a predetermined velocity while maintaining the circular shape.

On the other hand, if the ratio of the area is determined as being less than the threshold value, the parameter setting unit 104 determines the specified contour line as the formation. In such a case, the parameter setting unit 104 sets, for example, the coordinates of a representative point for approximately indicating the contour line, and the position of the coordinates of a position where the presence probability distribution of the target object takes the peak value, as parameter values for the formation of an arbitrary shape. Moreover, as a change in the formation, the parameter setting unit 104 determines that the unmanned machines 200 are to move at a predetermined average velocity toward the position where the presence probability distribution of the target object takes the peak value, while maintaining the shape similar to that of the specified contour line.

In this example, by the parameter setting unit 104 selecting a circular formation, the formation can be expressed more easily than when selecting a formation of an arbitrary shape. When the formation can be expressed easily, the load of the processing by the parameter setting unit 104 to change the formation according to the lapse of time is comparatively low.

On the other hand, by the parameter setting unit 104 selecting a formation of an arbitrary shape, the formation conforms better to the shape of the presence probability distribution of the target object when a circular shape does not conform to the shape of the presence probability distribution of the target object.

However, the process of the parameter setting unit 104 to determine the formation of the unmanned machines 200 is not limited to the process of this example.

As will be described later with reference to FIG. 2, the parameter setting unit 104 may have a function of selecting parameter values according to external signals. Also, the speed of changing a formation may be set externally as a velocity vector.

In order to determine the operation amount of the unmanned machine 200 in consideration of the formation shape, a parameter value related to the positional relationship between the target object and the unmanned machine 200 is required. As the parameter value related to the positional relationship between the target object and the unmanned machine 200, the parameter setting unit 104 may calculate the shortest distance between the contour line of the presence probability distribution of the target object and the position of the unmanned machine 200 subject to control.

In such a case, the parameter setting unit 104 outputs to the operation amount calculation unit 105 a parameter value indicating the formation shape, a velocity vector value, and the information of the shortest distance mentioned above.

The operation amount calculation unit 105 calculates the operation amount of the unmanned machine 200 subject to control in an integrated manner, using the state information of other unmanned machines 200 obtained from the information acquisition and transmission unit 101, the presence probability distribution of the target object calculated by the presence probability calculation unit 103, and the setting value calculated by the parameter setting unit 104.

As the method for the operation amount calculation unit 105 to calculate the operation amount, a method for determining the operation amount using an evaluation value obtained by an evaluation function may be used. An evaluation value can be referred to as information that represents the state of an unmanned machine with respect to the purpose of the unmanned machines 200. Therefore, an evaluation value can be used as an indication of an action rule, as a group of unmanned machines 200. Here, the purpose of the unmanned machines 200 is to detect and capture a target object.

In order to achieve the above purpose of the unmanned machines 200, it is important that the unmanned machines 200 capture the target object while maintaining its formation. Therefore, the operation amount calculation unit 105 may use the following two evaluation functions.

The first evaluation function $f_1$ of the two evaluation functions is an evaluation function for maintaining the formation shape, and is expressed by Equation (1).

[Equation 1]

$$f_{1,i} = = R_i \qquad (1)$$

Here, the subscript i is a serial number that identifies the unmanned machine 200, which means that it is the i-th unmanned machine. Therefore, indicates the first evaluation function used for the i-th unmanned machine 200. Accordingly, the i-th unmanned machine 200 is the unmanned machine 200 subject to control.

R indicates the shortest distance between the contour line of the presence probability distribution of a target object and the unmanned machine 200. Therefore, $R_i$ indicates the shortest distance between the contour line of the presence probability distribution of the target object and the i-th unmanned machine 200.

The second evaluation function $f_2$ is an evaluation function for maintaining an appropriate clearance between the unmanned machines 200, and is expressed by Equation (2).

[Equation 2]

$$f_{2,i} = (x_i - x_{i-1})^2 + (y_i - y_{i-1})_2 + (z_i - z_{i-1})_2 - (x_i - x_{i+1})^2 - (y_i - y_{i+1})^2 - (z_i - z_{i+1})^2 \qquad (2)$$

$f_{2,i}$ indicates the second evaluation function used for the i-th unmanned machine 200. The coordinates (x, y, z) indicate the position coordinates of the unmanned machine 200. Therefore, the coordinates $(x_i, y_i, z_i)$ indicate the position coordinates of the i-th unmanned machine 200.

The subscripts i−1 and i+1 indicate the unmanned machines 200 that are positioned closest to and on the left side and right side of the i-th unmanned machine 200 when viewed therefrom. The coordinates $(x_{i-1}, y_{i-1}, z_{i-1})$ and $(x_{i+1}, y_{i+1}, z_{i+1})$ indicate the position coordinates of these unmanned machines 200.

The operation amount calculation unit 105 uses the first evaluation function $f_1$ to calculate an evaluation value for evaluating the position of the unmanned machine 200 with respect to the presence probability of the target object. Moreover, the operation amount calculation unit 105 uses the second evaluation function $f_2$ to calculate an evaluation value for evaluating whether the balance of the distances between the unmanned machine 200 of evaluation target and the nearby unmanned machines 200 is maintained.

The operation amount calculation unit 105 uses these evaluation functions to determine the operation amount as follows, for example First, the operation amount calculation unit 105 uses Equation (3) for the velocity of unmanned machines.

[Equation 3]

$$V = \alpha \cdot \{(f_{1,i-1} - f_{1,i}) + (f_{1,i+1} - f_{1,i}) + \beta\} \quad (3)$$

Here, V is a standard value of a velocity vector. Through a computation using Equation (3), the operation amount calculation unit 105 calculates a velocity vector in which the standard value V of the velocity vector is corrected, on the basis of the relationship between the unmanned machine 200 subject to control and the left and right adjacent unmanned machines 200.

α is a coefficient that determines the degree of change and corresponds to a gain. The computation of the second term "$\cdot\{(f_{1,i-1} - f_{1,i}) + (f_{1,i+1} - f_{1,i}) + \beta\}$" of Equation (3) is a computation for comparing the value of the evaluation function $f_1$ of the unmanned machine 200 subject to control and the value of the evaluation function $f_1$ of the left and right adjacent unmanned machines 200 with each other. The operation amount calculation unit 105 performs computation of Equation (3) to calculate the operation amount of the unmanned machine 200 subject to control, by comparing the values (evaluation values) of the evaluation functions.

β is an offset attributed to the formation shape. If the formation shape is a circular shape, an arc shape, or an arbitrary shape, β=0. When the formation shape is a double circular shape or an ellipse shape, the parameter setting unit 104 sets a finite value for β according to the position for which the unmanned machine 200 subject to control is responsible.

The operation amount calculation unit 105 basically sets the traveling direction (vector) of the unmanned machine 200 subject to control to the direction toward the position where the probability of the presence of the target object is the highest. Specifically, the operation amount calculation unit 105 basically sets the traveling direction of the unmanned machine 200 subject to control to the direction that connects the position where the probability of the presence of the target object is the highest and the position of the unmanned machine 200 subject to control. The operation amount calculation unit 105 sets a velocity vector so that the unmanned machine 200 subject to control advances in that direction at the velocity calculated by Equation (3).

This velocity vector is referred to as main velocity vector $V_m$.

It is desirable that the unmanned machines 200 forming a formation capture a target object while having equal clearances therebetween. Therefore, the operation amount calculation unit 105 calculates an orthogonal vector $V_n$ with respect to the main velocity vector $V_m$ to make correction from the main velocity vector $V_m$. The operation amount calculation unit 105 calculates the orthogonal vector $V_n$ as shown in Equation (4).

[Equation 4]

$$V_n = \gamma \cdot f_{2,i} V_{ne} \quad (4)$$

Here, $V_{ne}$ indicates a unit vector that is orthogonal to the main velocity vector $V_m$ and is oriented in the direction where the i−1st unmanned machine exits. γ corresponds to gain. The evaluation function $f_2$ included in Equation (4) is an equation that compares the evaluation value of the unmanned machine 200 subject to control and the evaluation value of the adjacent unmanned machine 200 with each other. Therefore, Equation (4) is also an equation that compares the evaluation value of the unmanned machine 200 subject to control and the evaluation value of the adjacent unmanned machine 200 with each other.

The operation amount calculation unit 105 sets the resultant vector in which $V_m$ and $V_n$ are put together, as the operation amount of the unmanned machine 200 subject to control.

The operation setting unit 106 sets an operation setting value of an actuator that operates the unmanned machine 200 subject to control so that the unmanned machine 200 subject to control operates by the operation amount calculated by the operation amount calculation unit 105. In the case of the above example, the operation setting unit 106 performs operation setting for the unmanned machine 200 subject to control, so that the unmanned machine 200 subject to control operates on the velocity vector ($V_m+V_n$) calculated as an operation amount by the operation amount calculation unit 105.

The operation amount calculation unit 105 calculates evaluation amounts on the basis of Equation (3) and Equation (4) to thereby calculate the operation amount so that the values indicated by the evaluation values by Equation (1) and Equation (2) become higher. The unmanned machines 200 move according to the operation amount calculated by the operation amount calculation unit 105 and thereby approach the target object while forming the formation set by the parameter setting unit 104.

For example, as in the example of Equation (3), the operation amount calculation unit 105 calculates the operation amount of the unmanned machine 200 subject to control on the basis of Equation (1). As a result, the unmanned machine 200 subject to control moves on the contour line of the presence probability distribution of the target object, aiming at the position the distance to which is the shortest from the unmanned machine 200 itself. At this time, as in the examples of Equation (3) and Equation (4), the operation amount calculation unit 105 calculates the operation amount of the unmanned machine 200 subject to control also on the basis of the positional relationship as well as the velocity relationship between the unmanned machine 200 subject to control and the other unmanned machines 200. Thus, the unmanned machine 200 subject to control not only moves to the position on the contour line, but also moves while adjusting the positional relationship and the velocity relationship with the other unmanned machines 200. As a result, the plurality of unmanned machines 200 can move while maintaining the formation shape and maintaining appropriate clearance therebetween.

A combination of the information acquisition and transmission unit 101, the target object detection unit 102, the presence probability calculation unit 103, and the parameter setting unit 104 of the control device 100 corresponds to an example of a formation determination device, and determines the formation of the unmanned machines 200. For example, the formation determination device may be commonly provided for the plurality of unmanned machines 200, and the plurality of unmanned machines 200 may share the formation determined by the formation determination device.

Note that, for those cases where some of the unmanned machines 200 are desired to be switched to manual and where a person would like to appropriately change formation parameter values, the unmanned machine system 1 may further include a manual instruction input unit that receives user operations.

Figure 2:
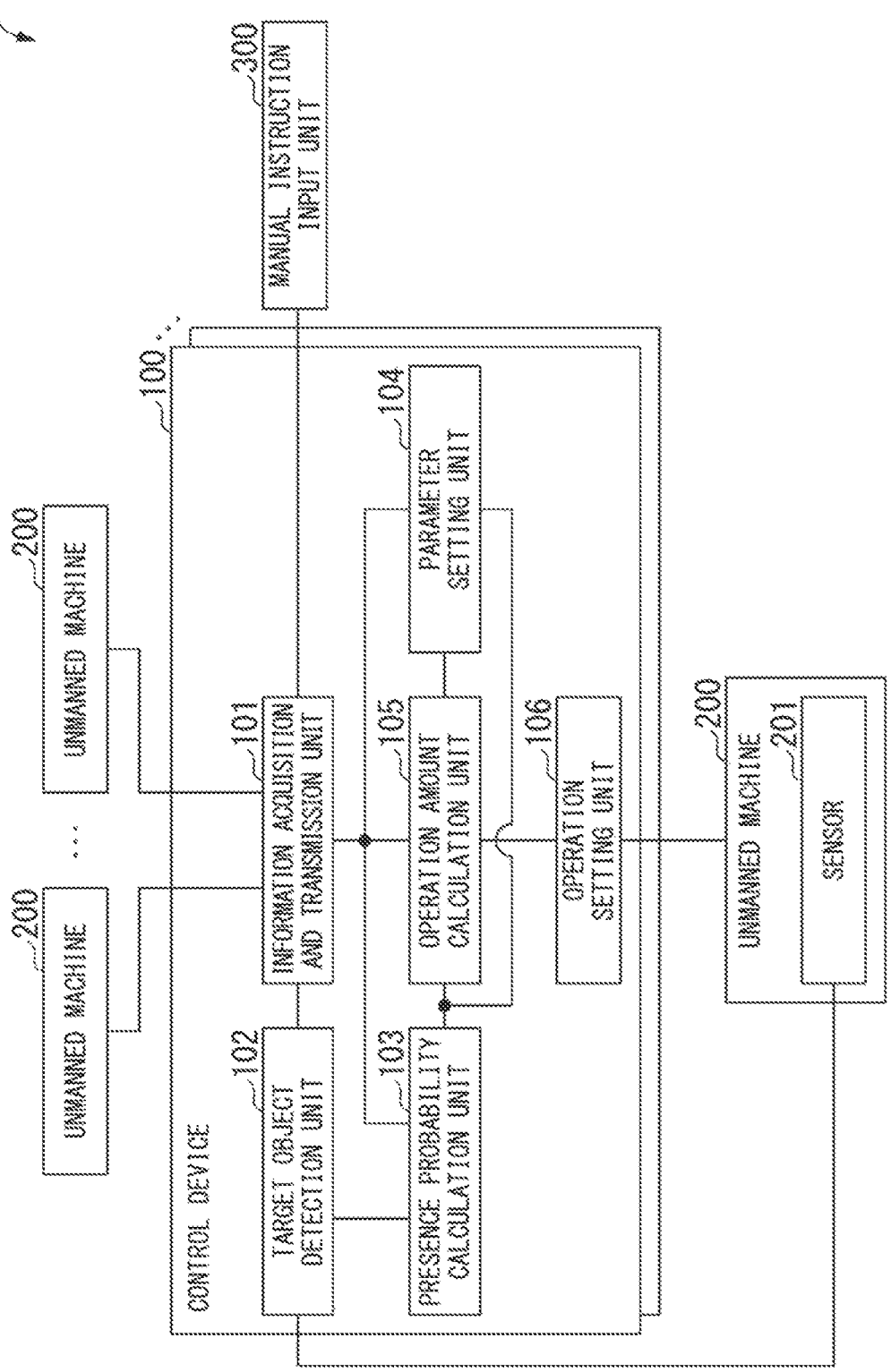
FIG. 2 is a schematic diagram showing a second example of the configuration of the unmanned machine system according to the example embodiment.

FIG. 2 is a schematic diagram showing a second example of the configuration of the unmanned machine system according to the example embodiment. In the configuration shown in FIG. 2, the unmanned machine system 1 includes a plurality of control devices 100, a plurality of unmanned machines 200, and a manual instruction input unit 300. The control device 100 includes an information acquisition and transmission unit 101, a target object detection unit 102, a presence probability calculation unit 103, a parameter setting unit 104, an operation amount calculation unit 105, and an operation setting unit 106. The unmanned machine 200 includes a sensor 201.

The unmanned machine system 1 having the configuration of FIG. 2 differs from the case of the configuration of FIG. 1 in that it further includes the manual instruction input unit 300. In other respects, the unmanned machine system 1 having the configuration of FIG. 2 is similar to the case of FIG. 1.

The manual instruction input unit 300 is configured as a terminal device including an input device such as a touch panel, an operation panel, or a keyboard and a mouse, or a combination thereof, for example, and receives operations performed by a person. A person that performs operations using the manual instruction input unit 300 is referred to as a user.

The manual instruction input unit 300 transmits input information indicating a received user operation to the control device 100. In the control device 100, the information acquisition and transmission unit 101 acquires the input information. The information acquisition and transmission unit 101 reports the input information to a function unit that performs processing corresponding to user's input, such as the parameter setting unit 104 or the operation amount calculation unit 105. The function unit having received the reporting performs processing according to the user operation, and thereby the control device 100 causes the unmanned machine 200 subject to control to operate according to the user operation.

For example, a user that collectively supervises a plurality of unmanned machines 200 may instruct a parameter value setting from the manual instruction input unit 300, and the parameter setting unit 104 may set a parameter value according to this instruction.

Specifically, the user may instruct the formation shape from the manual instruction input unit 300, and the parameter setting unit 104 may determine the formation shape to be the instructed shape. Alternatively, as described above, the parameter setting unit 104 may determine the formation shape on the basis of information related to the presence probability distribution of a target object.

A plurality of parameter value sets combining each parameter value for each formation shape may be provided, and the parameter setting unit 104 may set a value to each parameter by selecting one parameter value set. In such a case, the user may, from the manual command input unit 300, instruct the parameter value set that should be selected, and the parameter setting unit 104 may select the instructed parameter value set. Alternatively, as described above, the parameter setting unit 104 may select one parameter value set on the basis of information related to the presence probability distribution of the target object.

Alternatively, as described above, the parameter setting unit 104 may directly set a value for at least some of the parameters. In such a case, the user may, from the manual command input unit 300, instruct a parameter and a value that should be set to that parameter, and the parameter setting unit 104 may set the instructed value to the instructed parameter. Alternatively, as described above, the parameter setting unit 104 may calculate and set a value to be set for a parameter with no value having been set therefor, on the basis of the presence probability distribution of the target object.

Also, the user may specify a parameter value for all of the parameters for determining the formation, from the manual instruction input unit 300. Alternatively, the user may specify a parameter value for only some of the parameters for determining the formation, from the manual instruction input unit 300. For example, the user may instruct a formation shape from the manual instruction input unit 300, and the parameter setting unit 104 may determine the parameter value for the parameter provided for the instructed shape.

Moreover, the user may specify a parameter value for only some unmanned machines 200 of the plurality of unmanned machines 200, from the manual instruction input unit 300. Also, the user may specify a parameter value on a different level of detail for each unmanned machine 200, from the manual instruction input unit 300. For example, the user may specify a formation shape only for some of the unmanned machines 200, from the manual instruction input unit 300. Then, the user may, from the manual instruction input unit 300, specify, in addition to the formation shape for some other unmanned machines 200, a parameter value provided for that shape.

Also, the user may, from the manual instruction input unit 300, instruct, in addition to or instead of instructing a parameter value of the formation of the unmanned machines 200, an operation amount of the unmanned machine 200. For example, the manual instruction input unit 300 may, according to a user operation, transmit an instruction of a movement direction and a movement velocity of a specific unmanned machine 200 to that unmanned machine 200. Then, the operation amount calculation unit 105 of the unmanned machines 200 other than the unmanned machine 200 that received the instruction may calculate an operation amount for forming the formation, on the basis of the positional relationship and the velocity relationship with the unmanned machine 200 that received the instruction.

First Example of Control Device Arrangement

Figure 3:
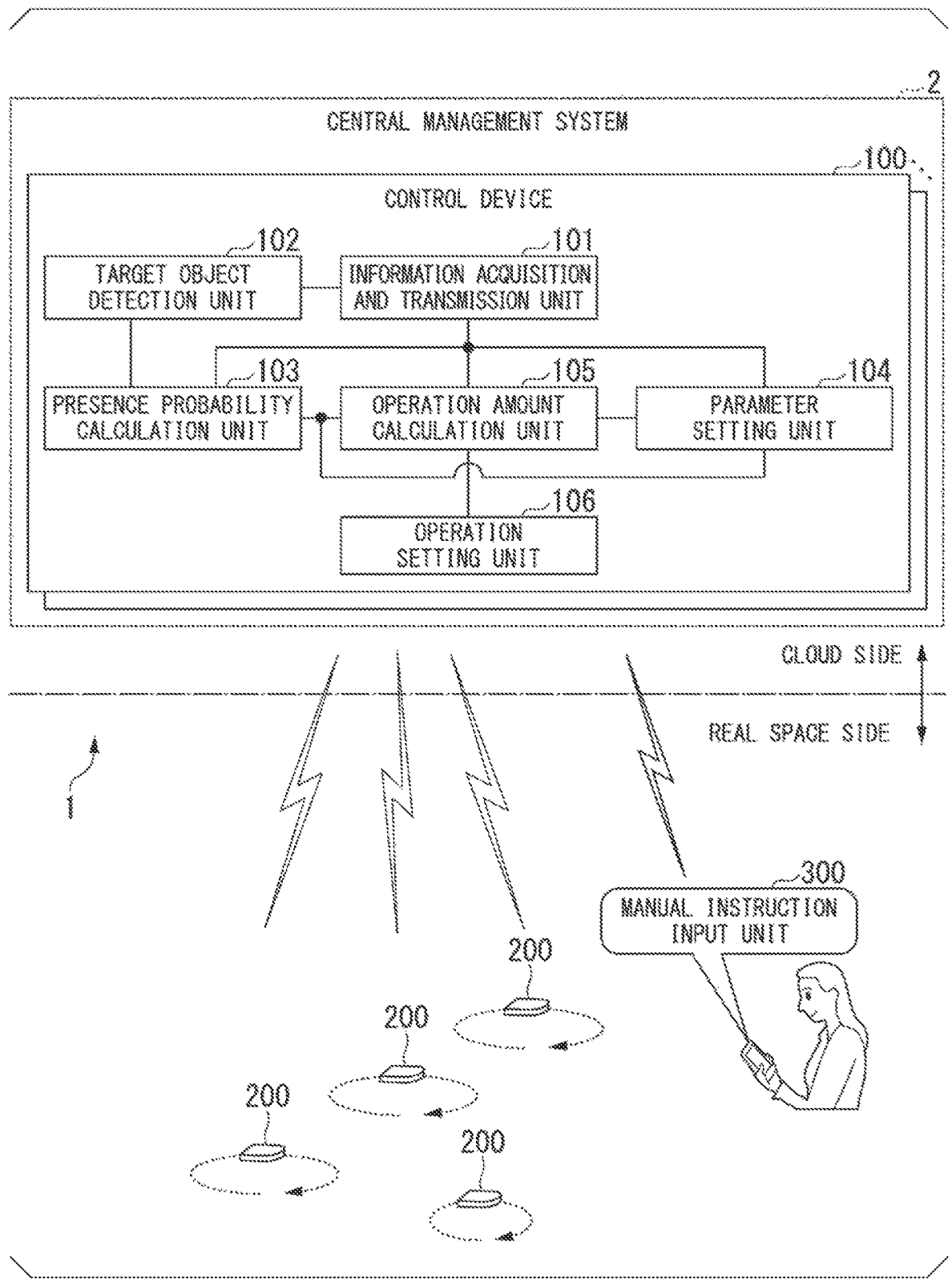
FIG. 3 is a diagram showing a first example of an arrangement of control devices according to the example embodiment.

FIG. 3 is a diagram showing a first example of the arrangement of the control devices 100. FIG. 3 is a configuration of the unmanned machine system 1 shown in FIG. 2, and shows an example in which a central management system 2 that integrates a plurality of control devices 100 each corresponding to each of the plurality of unmanned machines 200 is arranged in a cloud.

In the arrangement example of FIG. 3, as the unmanned machines 200, for example, unmanned machines called Unmanned Air Vehicles (UAV) that operate autonomously in the air and search for a search target with a radar may be used.

In the case of the arrangement example of FIG. 3, each control device 100 may be configured as a function on the cloud rather than being an individual substantial device. In other words, the control devices 100 may be deployed virtually on the cloud. Then, as if an unmanned machine 200 exchanges information with a nearby unmanned machine 200, the virtual control device 100 may issue control instructions to the unmanned machine 200 subject to control while exchanging information with the virtual control device 100 that controls the unmanned machine 200 near the unmanned machine 200 subject to control.

Evaluation functions and the like used in the arrangement example of FIG. 3 can be the same as the functions from Equation (1) to Equation (4) described above. Here, each UAV operates asynchronously, and information uploaded from the UAV is also asynchronous. Therefore, information is not collected synchronously even if the central management system 2 is arranged on the cloud. Thus, a normal optimization calculation related to search probability cannot be performed. Therefore, the central management system 2 controls each UAV using an autonomous algorithm that uses the evaluation functions mentioned above to optimize the operation of the entire UAV group.

Figure 4:
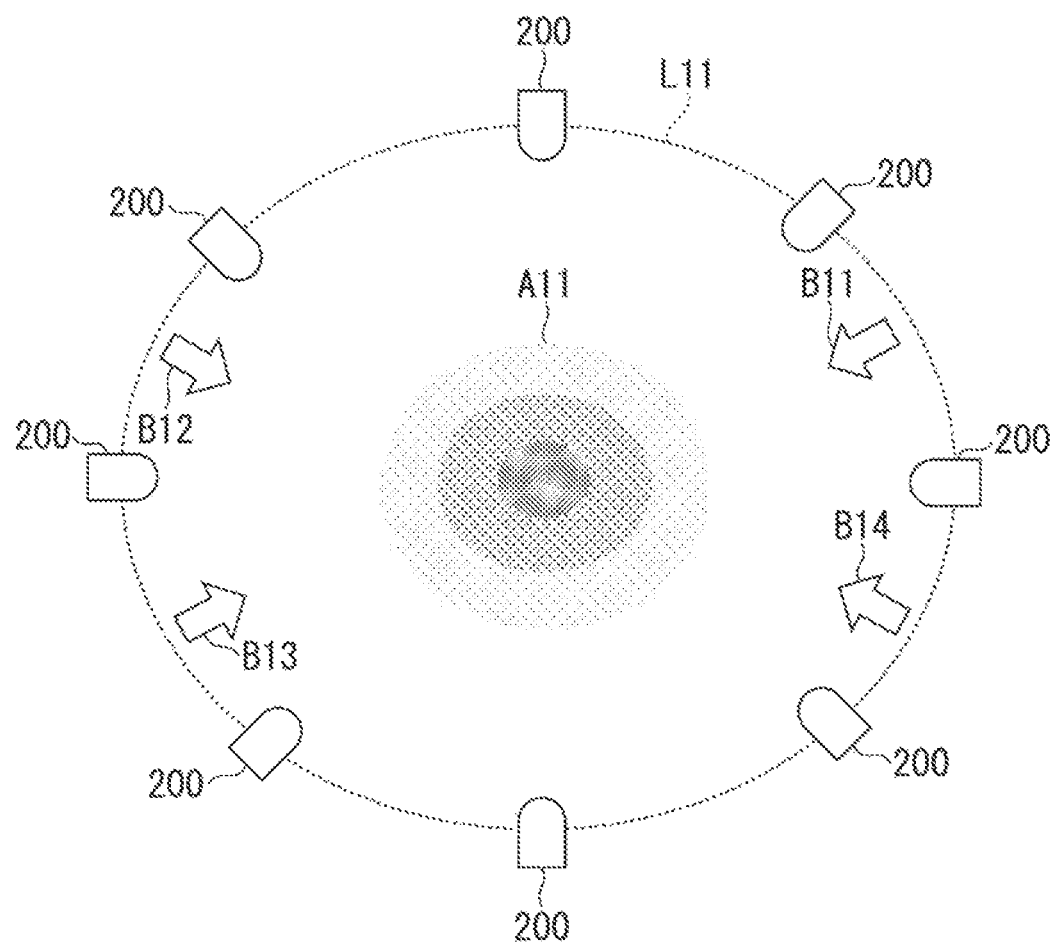
FIG. 4 is a diagram showing a first example of an operation result of the unmanned machine system according to the example embodiment.

FIG. 4 is a diagram showing a first example of an operation result of the unmanned machine system 1. FIG. 4 shows a schematic snapshot of a formation formed by the control device 100 controlling the unmanned machines 200.

The Line L11 indicates the formation of the unmanned machines 200. In the example of FIG. 4, the formation is circular.

Each of the arrows B11 to B14 shows information on a change in the formation. The orientation of the arrows indicates the direction in which the formation changes. The size (length) of the arrow indicates the speed of the change in the formation. In the example of FIG. 4, the formation becomes smaller while maintaining the circular shape. That is to say, the region within the formation becomes narrower.

The shades in a region A11 indicate a presence probability distribution of a target object. The darker (the blacker in FIG. 4) the indication is, the higher the presence probability is.

FIG. 4 shows that the unmanned machines 200 have formed a formation according to the presence probability distribution of the target object with a circular formation. From the state in FIG. 4, the unmanned machines 200 proceed to reduce the size of the encircling while maintaining the circular formation, and then enclose and capture the target object.

Thus, with use of the unmanned machine system 1, it is possible to more effectively and more efficiently execute the operation of capturing the target object by means of the plurality of unmanned machines 200.

Figure 5:
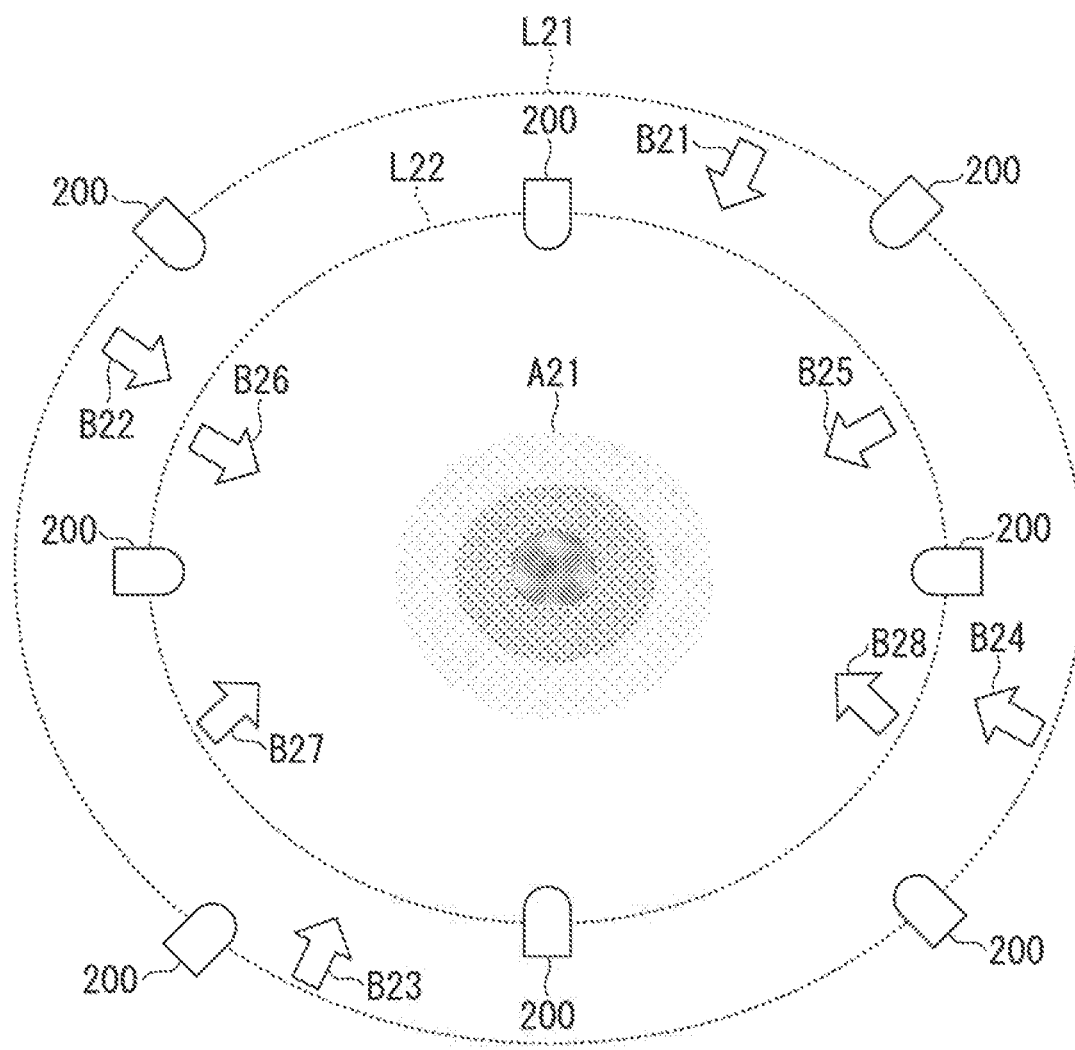
FIG. 5 is a diagram showing a second example of the operation result of the unmanned machine system according to the example embodiment.

FIG. 5 is a diagram showing a second example of an operation result of the unmanned machine system 1. FIG. 5 shows a schematic snapshot of a formation formed by the control device 100 controlling the unmanned machines 200. FIG. 5 shows a schematic snapshot of the formation formed by the control device 100 controlling the unmanned machines 200 and by an instruction from the manual instruction input unit 300.

The lines L21, L22 indicate the formation of the unmanned machines 200. In the example of FIG. 5, the shape of the formation is changed from circular to double-circular, via the manual instruction input unit.

Each of the arrows B21 to B24 shows information on a change in the formation indicated by the line L21. Each of the arrows B21 to B24 shows information on a change in the formation indicated by the line L21. Each of the arrows B25 to B28 shows information on a change in the formation indicated by the line L22. The orientation of the arrow B11 indicates the direction in which the formation changes. The size (length) of the arrow B11 indicates the speed of the change in the formation. In the example of FIG. 5, the formation becomes smaller while maintaining the shape of double circle. That is to say, the region within the formation becomes narrower.

The shades in a region A21 indicate a presence probability distribution of a target object. The darker (the blacker in FIG. 5) the indication is, the higher the presence probability is.

FIG. 5 shows that the unmanned machines 200 have formed a formation according to the presence probability distribution of the target object with a double-circular formation. From the state in FIG. 5, the unmanned machines 200 proceed to reduce the range of the encircling while maintaining the double-circular formation, and then enclose and capture the target object.

Second Example of Control Device Arrangement

Figure 6:
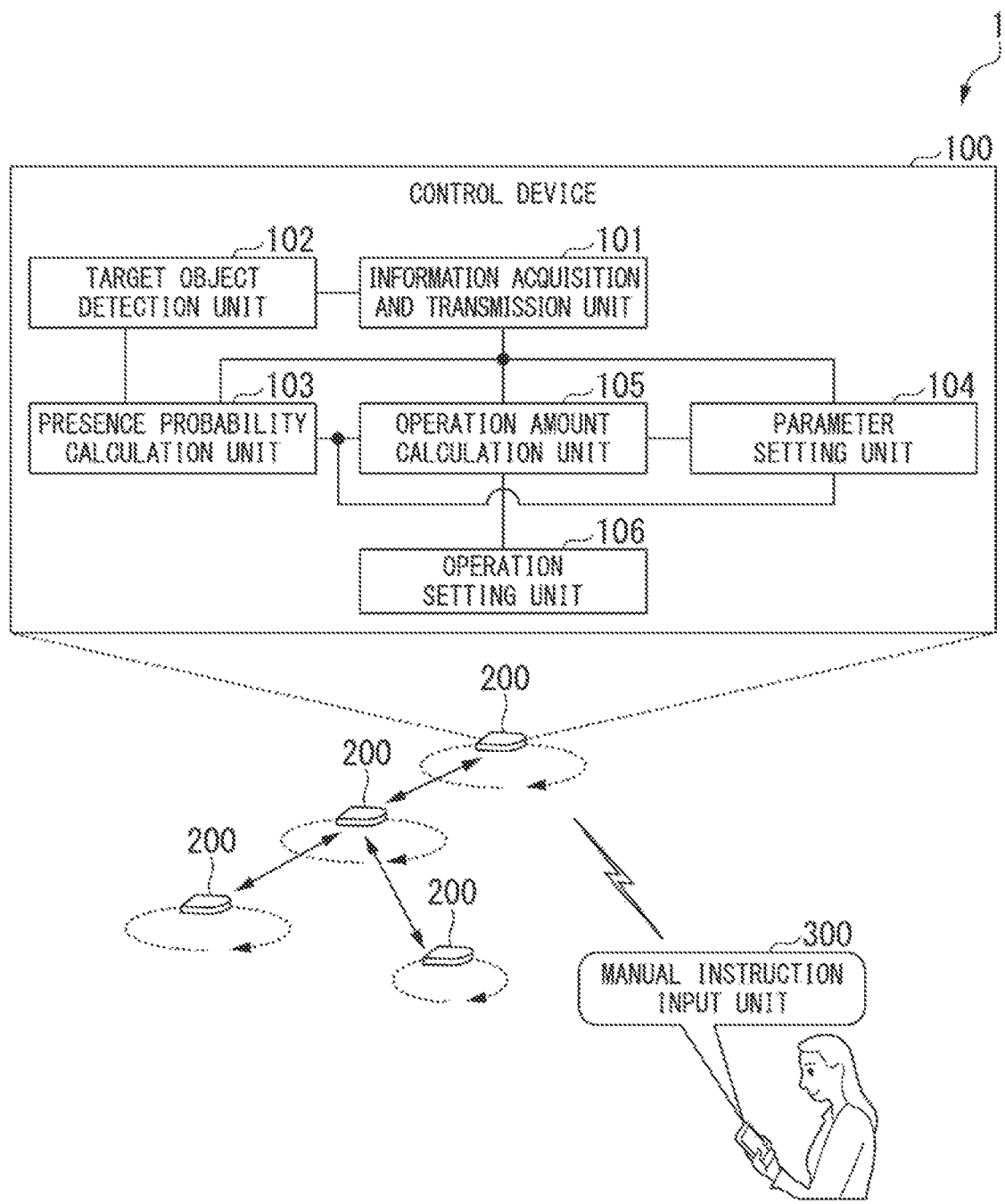
FIG. 6 is a diagram showing a first example of the arrangement of the control device according to the example embodiment.

FIG. 6 is a diagram showing a first example of the arrangement of the control devices 100. FIG. 6 shows an example in which the control device 100 is mounted in each unmanned machine 200 subject to control with a configuration of the unmanned machine system 1 shown in FIG. 2.

In the case of the arrangement in FIG. 6, each unmanned machine 200 exchanges information with a nearby communicable unmanned machine 200, and acts in an autonomous and decentralized manner under instructions from the control device 100 mounted in the self unmanned machine 200. The arrangement of having the control device 100 mounted in the unmanned machine 200 as shown in FIG. 6 is effective in those cases where information acquisition from a field within which a group of unmanned machines are operating is difficult and the group of unmanned machines must be expected to operate in an autonomous and decentralized manner. Such cases are considered very common in situations of actual applications. Moreover, even in those cases where it is difficult to assume a central management system or where the central management system has ceased to function, the arrangement of having the control device 100 mounted in the unmanned machine 200 as shown in FIG. 6 is effective.

In the case of the arrangement in FIG. 6, all the conditions such as the unmanned machines 200 used and the evaluation functions can be similar to those in the case of the arrangement in FIG. 3. The most significant difference between the case of FIG. 6 and the case of FIG. 3 is whether or not to upload information to the central management system 2 (FIG. 3). In the example of FIG. 6, information is not uploaded to the central management system. A target position acquisition unit is mounted in the unmanned machine 200, and information related to a search target is also exchanged with a nearby unmanned machine 200.

Figure 7:
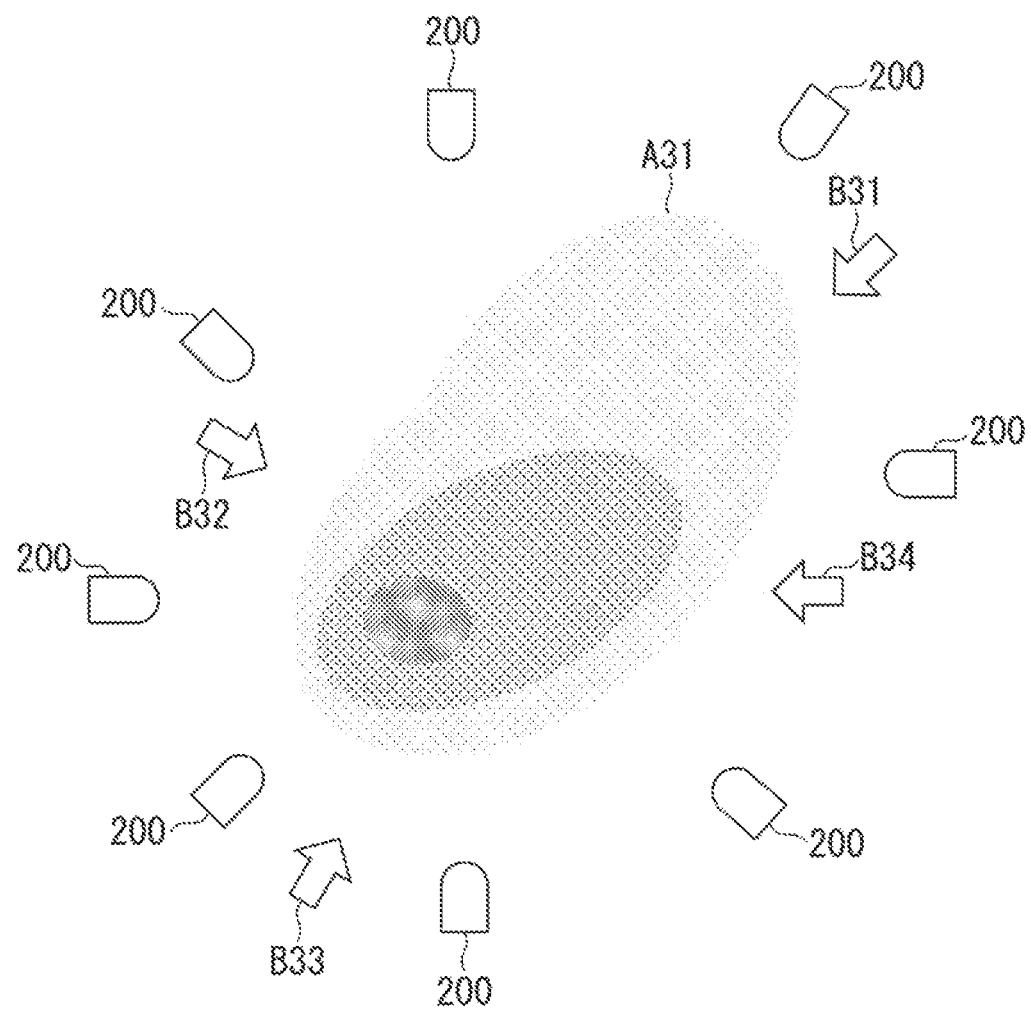
FIG. 7 is a diagram showing a third example of the operation result of the unmanned machine system according to the example embodiment.

FIG. 7 is a diagram showing a third example of an operation result of the unmanned machine system 1.

An operation in a case where, in the arrangement in FIG. 6, the formation shape of the unmanned machines 200 is an arbitrary shape and the presence probability of the target object is an indeterminate shape was confirmed by simulation. FIG. 7 shows a snapshot of a result of the operation.

The shades in a region A31 indicate a presence probability distribution of a target object. The darker (the blacker in FIG. 7) the indication is, the higher the presence probability is.

The arrows B31 to B34 show information on a change in the arrangement of the unmanned machines 200. The orientation of the arrows indicates the direction in which the formation changes. The size (length) of the arrow indicates the speed of the change in the formation.

In the example of FIG. 7, the formation of the unmanned machines 200 is arbitrary, and therefore, lines indicating the formation are not shown in FIG. 7; however, the unmanned machines 200 are surrounding the region A31 where the presence probability distribution is high with a shape similar to that of the contour line of the presence probability distribution of the target object. The unmanned machines 200 move in directions and at velocities indicated by the arrows B31 to B34 to thereby reduce the range of the encircling while maintaining the shape similar to that of the contour line of the presence probability distribution of the target object. As a result, the unmanned machines 200 reduce the range of the encircling while moving without breaking the encircling, and enclose and capture the target object.

Thus, even when the control device 100 is mounted in each of the unmanned machines 200 to perform control, it still operates effectively.

Another Example

In FIG. 3, the case of having the central management system 2 implemented in a cloud is illustrated. This central management system may be established as a special system. For example, a central management system may be established and set up on a coast, and the central management system 2 may issue instructions to a plurality of UAVs. Alternatively, a central management system may be set up on a mothership that coordinates a plurality of UAVs.

As the unmanned machines 200, unmanned machines other than UAVs as mentioned above may be used. For example, aerial-type unmanned machines that fly in the air may be used as the unmanned machines 200, or unmanned machines that travel on land may be used.

The unmanned machine system 1 may include a plurality of manual instruction input units 300 so that a plurality of users manually operate individual unmanned machines 200.

As described above, the information acquisition and transmission unit 101 acquires position information of the unmanned machine 200 subject to control, and position information of an unmanned machine 200 not subject to control. The target object detection unit 102 attempts to detect a target object, using a sensor signal from a sensor 201 mounted in the unmanned machine 200. The presence probability calculation unit 103 calculates a presence probability distribution of the target object on the basis of information on a position and a time at which detection of the target object succeeded. The parameter setting unit 104 determines the formation of the plurality of unmanned machines 200 by setting parameter values. The operation amount calculation unit 105 calculates an operation amount of the unmanned machine subject to control, on the basis of the set formation. The operation setting unit 106 sets operation of the unmanned machine subject to control, according to the calculated operation amount.

As a result, the control device 100 enables capturing of a target object more efficiently. Specifically, according to the control device 100, capturing can be performed efficiently in terms of a target object being able to be captured with use of the unmanned machines 200, and manpower being able to be reduced.

Moreover, according to the control device 100, the unmanned machines 200 can approach a target object while maintaining the formation thereof and surrounding the target object. In terms of this, the control device 100 enables effective detection and capture of a target object.

Moreover, the operation amount calculation unit 105 calculates the operation amount of the unmanned machine 200 subject to control, on the basis of position information of the unmanned machine 200 subject to control and position information of an unmanned machine 200 not subject to control.

As a result, the operation amount calculation unit 105 can calculate the operation of the unmanned machine 200 subject to control, on the basis of the positional relationship between the position of the unmanned machine 200 subject to control and the position of an unmanned machine 200 not subject to control, and can adjust the relative positional relationship between the unmanned machines 200. For example, the operation amount calculation unit 105 can maintain the clearance between the unmanned machines 200 at an appropriate distance.

Furthermore, the manual instruction input unit 300 receives a user operation. The operation amount calculation unit 105 calculates the operation amount on the basis of, in addition to the formation, the user operation.

The control device 100 enables operation of the unmanned machines 200 that reflects the user's intention in terms of operating the unmanned machines 200 on the basis of a user operation.

Moreover, the manual instruction input unit 300 receives a user operation for switching between the manual setting and the automatic setting of the control of the unmanned machine 200, and a user operation for performing control setting for the unmanned machine 200 that is set to manual. The operation amount calculation unit 105 calculates an operation amount on the basis of, in addition to the formation, the position and velocity of the unmanned machine 200 that have been set manually.

According to the control device 100, when the user manually operates some unmanned machines 200, the operation of the other unmanned machines 200 can be automatically controlled, and in terms of this, the control device 100 enables more efficient capture of a target object. Specifically, according to the control device 100, capturing can be performed efficiently in terms of causing some unmanned machines 200 to operate automatically to be able to capture a target object, and manpower being able to be reduced.

Moreover, the presence probability calculation unit 103 calculates a presence probability distribution of a target object, the spatial extent of which becomes greater as the length of time that elapses after the target object detection unit 102 succeeds in detecting the target object becomes greater.

When the length of time that has elapsed after the target object detection unit 102 succeeding in detecting the target object is longer, the possibility of the target object having moved becomes higher, and the distance by which the target object may possibly have moved becomes longer. By calculating the presence probability distribution of the target object, the spatial extent of which becomes greater as the length of time that elapses after the target object detection unit 102 succeeds in detecting the target object becomes greater, the presence probability calculation unit 103 can calculate a presence probability distribution according to the possibility the target object is moving and the distance by which the target object may possibly have moved. In terms of this, the presence probability calculation unit 103 can highly accurately calculate the presence probability distribution of a target object.

Furthermore, the operation amount calculation unit 105 calculates the operation amount so that evaluation becomes even higher, on the basis of an evaluation value of the unmanned machine 200 subject to control in relation to the shape of the formation, and of an evaluation value of the unmanned machine 200 subject to control in relation to a relationship thereof with another unmanned machine 200.

As a result, the operation amount calculation unit 105 can calculate an operation amount so that the unmanned machines 200 form a formation and the unmanned machines 200 are positioned while having an appropriate distance from each other.

Furthermore, the operation amount calculation unit 105 calculates the operation amount, on the basis of the relationship between the presence probability distribution of the target object and the position of the unmanned machine 200 subject to control. For example, the operation amount calculation unit 105 calculates the operation amount, on the basis of the positional relationship between the contour line of the presence probability distribution of the target object and the unmanned machine 200 subject to control.

As a result, the operation amount calculation unit 105 can calculate the operation amount so that the unmanned machines 200 subject to control form a formation on the basis of the presence probability distribution of the target object.

Next, a configuration of an example embodiment of the present invention will be described, with reference to FIG. 8 to FIG. 9.

Figure 8:
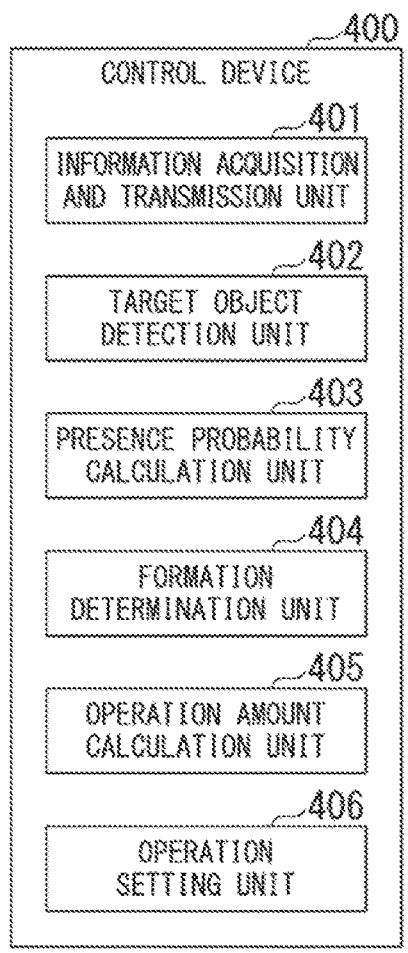
FIG. 8 is a diagram showing an example of a configuration of the control device according to the example embodiment.

FIG. 8 is a diagram showing an example of a configuration of a control device according to the example embodiment. A control device 400 shown in FIG. 8 includes an information acquisition and transmission unit 401, a target object detection unit 402, a presence probability calculation unit 403, a formation determination unit 404, an operation amount calculation unit 405, and an operation setting unit 406.

In this configuration, the information acquisition and transmission unit 401 acquires position information of an unmanned machine subject to control, and position information of another unmanned machine not subject to control. The object detection unit 402 attempts to detect a target object, using a sensor signal from a sensor mounted in the unmanned machine. The presence probability calculation unit 403 calculates a presence probability distribution of the target object on the basis of information on a position and a time at which detection of the target object succeeded. The formation determination unit 404 sets a parameter value for determining a formation of a plurality of the unmanned machines on the basis of the presence probability distribution of the target object. The formation determination unit 404 has a function similar to that of the parameter setting unit 104 as described above. The operation amount calculation unit 405 calculates an operation amount of the unmanned machine subject to control, on the basis of the set formation. The operation setting unit 406 performs operation setting on the unmanned machine subject to control, according to the calculated operation amount.

As a result, the control device 400 enables capturing of a target object more efficiently.

Figure 9:
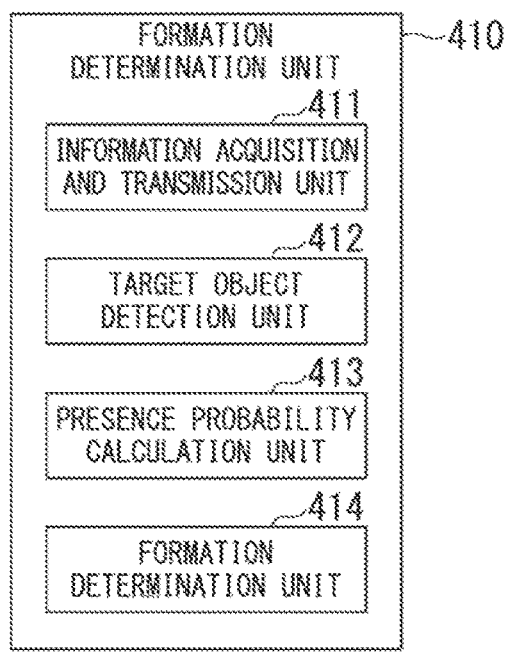
FIG. 9 is a diagram showing an example of a configuration of a formation determination device according to the example embodiment.

FIG. 9 is a diagram showing an example of a configuration of a formation determination device according to the example embodiment. A formation determination device 410 shown in FIG. 9 includes an information acquisition and transmission unit 411, a target object detection unit 412, a presence probability calculation unit 413, and a formation determination unit 414.

In this configuration, the information acquisition and transmission unit 411 acquires position information of an unmanned machine subject to control, and position information of another unmanned machine not subject to control. The object detection unit 412 attempts to detect a target object, using a sensor signal from a sensor mounted in the unmanned machine. The presence probability calculation unit 413 calculates a presence probability distribution of the target object on the basis of information on a position and a time at which detection of the target object succeeded. The formation determination unit 414 sets a parameter value for determining a formation of a plurality of the unmanned machines on the basis of the presence probability distribution of the target object. The formation determination unit 414 has a function similar to that of the parameter setting unit 104 as described above.

As a result, in the formation determination device 410, a formation of unmanned machines can be determined according to the presence probability distribution of the target object. The capturing of a target object can be performed more efficiently by using the formation determined by the formation determination device 410.

Figure 10:
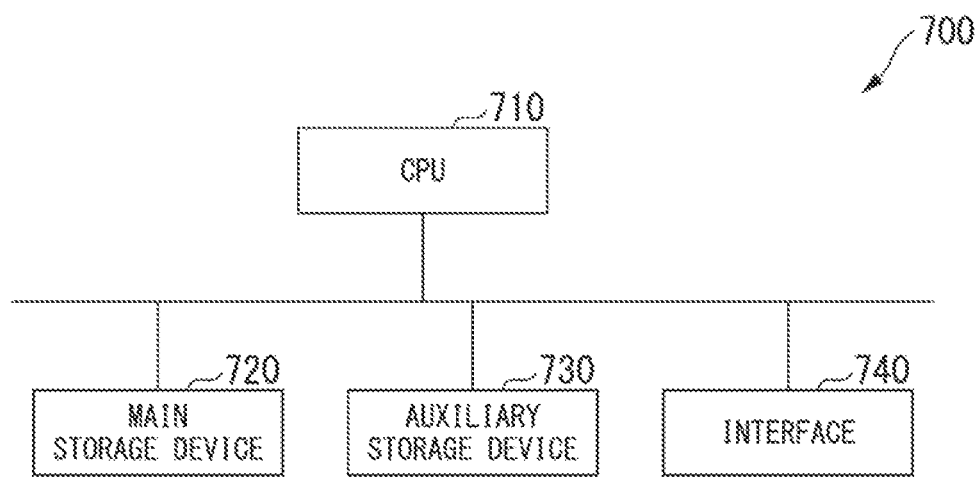
FIG. 10 is a schematic block diagram showing a configuration of a computer according to at least one example embodiment.

FIG. 10 is a schematic block diagram showing a configuration of a computer according to at least one example embodiment.

In the configuration shown in FIG. 10, a computer 700 includes a CPU (Central Processing Unit) 710, a main storage device 720, an auxiliary storage device 730, and an interface 740.

One or more of the control devices 100 and 400 may be implemented in the computer 700. In such a case, operations of the respective processing units described above are stored in the auxiliary storage device 730 in a form of program. The CPU 710 reads the program from the auxiliary storage device 730, develops it on the main storage device 720, and executes the processing described above according to the program. Moreover, the CPU 710 secures, according to the program, storage regions corresponding to the respective storage units mentioned above, in the main storage device 720. Communication between an unmanned machine control device or movable body control device and another device is executed by the interface 740 having a communication function and communicating according to the control of the CPU 710.

In the case where the control device 100 is implemented in the computer 700, operations of the information acquisition and transmission unit 101, the target object detection unit 102, the presence probability calculation unit 103, the parameter setting unit 104, the operation amount calculation unit 105, and the operation setting unit 106 are stored in the auxiliary storage device 730 in a form of program. The CPU 710 reads the program from the auxiliary storage device 730, expands it on the main storage device 720, and executes the processing described above according to the program.

Communication between the control device 100 and another device such as the unmanned machine 200 is performed by the interface 740 having a communication function and communicating according to the control of the CPU 710.

In the case where the control device 400 is implemented in the computer 700, operations of the information acquisition and transmission unit 401, the target object detection unit 402, the presence probability calculation unit 403, the formation determination unit 404, the operation amount calculation unit 405, and the operation setting unit 406 are stored in the auxiliary storage device 730 in a form of program. The CPU 710 reads the program from the auxiliary storage device 730, expands it on the main storage device 720, and executes the processing described above according to the program.

Communication between the control device 400 and the unmanned machine is performed by the interface 740 having a communication function and communicating according to the control of the CPU 710.

Note that a program for realizing all or part of the functions of the control devices 100 and 400 may be recorded on a computer-readable recording medium, and the program recorded on the recording medium may be read into and executed on a computer system, to thereby perform the processing of each unit. The "computer system" referred to here includes an OS (operating system) and hardware such as peripheral devices.

Moreover, the "computer-readable recording medium" referred to here refers to a portable medium such as a flexible disk, a magnetic optical disk, a ROM (Read Only Memory), and a CD-ROM (Compact Disc Read Only Memory), or a storage device such as a hard disk built in a computer system. The above program may be a program for realizing a part of the functions described above, and may be a program capable of realizing the functions described above in combination with a program already recorded in a computer system.

The example embodiments of the present invention have been described in detail with reference to the drawings; however, the specific configuration of the invention is not limited to the example embodiments, and may include design changes and so forth that do not depart from the scope of the present invention.

INDUSTRIAL APPLICABILITY

The example embodiments of the present invention may be applied to a control device, a control method, and a program.

REFERENCE SYMBOLS

1 Unmanned machine system
2 Central management system
100, 400 Control device
101, 401, 411 Information acquisition and transmission unit
102, 402, 412 Target object detection unit
103, 403, 413 Presence probability calculation unit
104 Parameter setting unit
106, 406 Operation setting unit
200 Unmanned machine
300 Manual instruction input unit
404, 414 Formation determination unit
410 Formation determination device

What is claimed is:

1. A control device comprising:
at least one memory configured to store instructions; and
at least one processor configured to execute the instructions to:
   acquire position information of a first unmanned machine subject to control, position information of a second unmanned machine adjacent to the first unmanned machine and not subject to control, and position information of a third unmanned machine adjacent to the first unmanned machine and not subject to control;
   attempt to detect a target object, using a sensor signal from a sensor mounted in at least one of the first, second, and third unmanned machines;
   calculate a presence probability distribution of the target object based on information on a position and a time at which detection of the target object is successful;
   determine a formation of the first, second, and third unmanned machines based on the presence probability distribution of the target object;
   calculate an operation amount of the first unmanned machine, based on the formation; and
   perform operation setting on the first unmanned machine, according to the calculated operation amount, wherein
calculation of the operation amount of the first unmanned machine includes:
   when a contour line of the presence probability distribution of the target object is set as a shape of the formation and a shortest distance between the contour line and the first unmanned machine is larger than a distance between the contour line and each of the second and third unmanned machines, calculating the operation amount so that a velocity at which the first unmanned machine subject travels toward a direction where the presence probability of the target object is highest increases; and
   when the contour line of the presence probability distribution of the target object is set as the shape of the formation and the shortest distance between the contour line and the first unmanned machine is larger than the distance between the contour line and each of the second and third unmanned machines, calculating the operation amount so that the velocity at which the unmanned machine subject to control travels toward the direction where the presence probability of the target object is highest decreases.

2. The control device according to claim 1, wherein the calculation of the operation amount of the first unmanned machine is further based on the position information of the first unmanned machine and the position information of each of the second and third unmanned machines.

3. The control device according to claim 2, wherein the calculation of the operation amount of the first unmanned machine is further based on a user operation received via an interface.

4. The control device according to claim 3,
wherein the interface receives a user operation for switching between a manual setting and an automatic setting of control of the first unmanned machine, and receives a user operation for performing control setting for the first unmanned machine upon having been switched to the manual setting, and
the calculation of the operation amount of the first unmanned machine is further based on the user operation for performing the control setting for the first unmanned machine upon having been switched to the manual setting.

5. The control device according to claim 1, wherein the presence probability distribution of the target object is calculated to have a spatial extent that becomes greater as a length of time that elapses from succeeding in detecting the target object becomes greater.

6. The control device according to claim 1, wherein calculating the operation amount of the first unmanned machine is calculated such that the evaluation becomes higher, based on an evaluation value of the first unmanned machine in relation to a shape of the formation and an evaluation value of the first unmanned machine in relation to a relationship with the second or third unmanned machine.

7. The control device according to claim 1, wherein the calculation of the operation amount of the first unmanned machine is further based on a relationship between the presence probability distribution of the target object and the position of the first unmanned machine.

8. The control device according to claim 1 wherein the calculation of the operation amount of the first unmanned machine further includes:
- when the contour line of the presence probability distribution of the target object is set as the shape of the formation, calculating the operation amount so that the first unmanned machine subject the second or third adjacent unmanned machine that is farther from the first unmanned machine.

9. A control method comprising:
- acquiring, by a processor, position information of a first unmanned machine subject to control, position information of a second unmanned machine adjacent to the first unmanned machine and not subject to control, and position information of a third unmanned machine adjacent to the first unmanned machine and not subject to control;
- attempting, by the processor, to detect a target object, using a sensor signal from a sensor mounted in at least one of the first, second, and third unmanned machines;
- calculating, by the processor, a presence probability distribution of the target object based on information on a position and a time at which detection of the target object is successful;
- determining, by the processor, a formation of the first, second, and third unmanned machines based on the presence probability distribution of the target object;
- calculating, by the processor, an operation amount of the first unmanned machine, based on the formation; and
- performing, by the processor, operation setting on the first unmanned machine, according to the calculated operation amount, wherein calculation of the operation amount of the first unmanned machine includes:
- when a contour line of the presence probability distribution of the target object is set as a shape of the formation and a shortest distance between the contour line and the first unmanned machine is larger than a distance between the contour line and each of the second and third unmanned machines, calculating the operation amount so that a velocity at which the first unmanned machine subject travels toward a direction where the presence probability of the target object is highest increases; and
- when the contour line of the presence probability distribution of the target object is set as the shape of the formation and the shortest distance between the contour line and the first unmanned machine is larger than the distance between the contour line and each of the second and third unmanned machines, calculating the operation amount so that the velocity at which the unmanned machine subject to control travels toward the direction where the presence probability of the target object is highest decreases.

* * * * *